United States Patent
Delort

(10) Patent No.: US 8,544,176 B2
(45) Date of Patent: Oct. 1, 2013

(54) METHOD OF FORMING A PANEL ASSEMBLY OF A VENTRAL FAIRING OF AN AIRCRAFT

(75) Inventor: Pierre Delort, Tournefeuille (FR)

(73) Assignee: Airbus Operations SAS, Toulouse (FR)

(*) Notice: Subject to any disclaimer, the term of this patent is extended or adjusted under 35 U.S.C. 154(b) by 787 days.

(21) Appl. No.: 12/438,184

(22) PCT Filed: Aug. 28, 2007

(86) PCT No.: PCT/FR2007/051848
§ 371 (c)(1),
(2), (4) Date: Oct. 21, 2009

(87) PCT Pub. No.: WO2008/029048
PCT Pub. Date: Mar. 13, 2008

(65) Prior Publication Data
US 2010/0077695 A1    Apr. 1, 2010

(30) Foreign Application Priority Data
Sep. 8, 2006 (FR) ...................................... 06 53622

(51) Int. Cl.
*B64C 1/12* (2006.01)
(52) U.S. Cl.
USPC ..................... 29/897.32; 29/525.01; 244/119; 244/130; 244/131; 52/460; 52/466; 52/461
(58) Field of Classification Search
USPC .................... 29/525.05, 525.01, 467, 897.32, 29/897.3; 52/459, 460, 465, 466, 457, 468, 52/461, 463; 244/120, 119, 130, 131
See application file for complete search history.

(56) References Cited

U.S. PATENT DOCUMENTS

| | | | | |
|---|---|---|---|---|
| 1,549,721 A * | 8/1925 | Kraft | ............................. | 220/685 |
| 2,118,561 A * | 5/1938 | Kleeberg | ........................ | 411/338 |
| 2,388,297 A * | 11/1945 | Slaughter | ......................... | 428/53 |
| 2,784,814 A * | 3/1957 | Bright | ............................. | 52/463 |
| 3,134,020 A * | 5/1964 | Shoenfeld | ................... | 250/517.1 |
| 3,216,538 A * | 11/1965 | Miller | ............................. | 52/781 |
| 3,265,417 A * | 8/1966 | Kastan | ............................ | 52/463 |
| 3,279,124 A | 10/1966 | Brown | | |
| 3,551,963 A * | 1/1971 | Mosher, Jr. et al. | ............. | 24/618 |
| 3,675,380 A * | 7/1972 | Moss | ............................. | 52/81.4 |
| 3,688,460 A * | 9/1972 | Van Loghem et al. | .......... | 52/466 |
| 3,699,735 A * | 10/1972 | Smith | ...................... | 52/204.597 |

(Continued)

FOREIGN PATENT DOCUMENTS

FR    1 252 603 A    2/1961
JP    H11324151 A    11/1999

OTHER PUBLICATIONS

International Search Report, PCT/FR2007/051848, mailed Dec. 2, 2008.

*Primary Examiner* — David Bryant
*Assistant Examiner* — Jason L Vaughan
(74) *Attorney, Agent, or Firm* — Dickinson Wright PLLC

(57) ABSTRACT

A panel assembly, in which the liaison between two adjacent panels is sealed by a sealing joint, where the sealing joint comprises a central part, housed in an interstice between the two panels, and an external part, facing the exterior of the panel assembly, and capable of covering at least partially the external face of the two longitudinal edges of the panels surrounding the interstice. Also, a method for mounting a panel assembly, in which two adjacent panels are fixed to one another.

9 Claims, 2 Drawing Sheets

(56) References Cited

U.S. PATENT DOCUMENTS

| | | | | |
|---|---|---|---|---|
| 3,729,124 | A | 4/1973 | Kedzior | |
| 3,785,104 | A * | 1/1974 | Dailen | 52/204.597 |
| 3,866,374 | A * | 2/1975 | Dallen | 52/204.597 |
| 3,879,916 | A * | 4/1975 | Bigham | 52/463 |
| 3,925,953 | A * | 12/1975 | LaBorde | 52/745.19 |
| 3,925,956 | A * | 12/1975 | Atkinson et al. | 403/217 |
| 3,932,974 | A * | 1/1976 | Wright | 52/235 |
| 3,938,291 | A * | 2/1976 | Criswell | 52/844 |
| 3,968,608 | A * | 7/1976 | Swango | 52/235 |
| 3,974,613 | A * | 8/1976 | Criswell | 52/204.597 |
| 4,055,921 | A * | 11/1977 | de Carteret | 52/61 |
| 4,067,155 | A * | 1/1978 | Ruff et al. | 52/105 |
| 4,165,589 | A * | 8/1979 | de Carteret | 52/61 |
| 4,292,774 | A * | 10/1981 | Mairle | 52/208 |
| 4,443,979 | A * | 4/1984 | Varon et al. | 52/36.6 |
| 4,535,525 | A * | 8/1985 | Varon et al. | 29/463 |
| 4,648,231 | A * | 3/1987 | Laroche | 52/775 |
| 4,745,723 | A * | 5/1988 | Esposito | 52/464 |
| RE32,839 | E * | 1/1989 | Saito et al. | 198/335 |
| 4,901,485 | A * | 2/1990 | Menchetti et al. | 52/145 |
| 4,936,065 | A * | 6/1990 | Hutchinson | 52/235 |
| 5,014,934 | A * | 5/1991 | McClaflin | 244/132 |
| 5,062,250 | A * | 11/1991 | Buzzella | 52/586.2 |
| 5,065,960 | A * | 11/1991 | Castellucci | 244/131 |
| 5,076,035 | A * | 12/1991 | Wright | 52/464 |
| 5,106,037 | A * | 4/1992 | Sherrill | 244/132 |
| 5,155,952 | A * | 10/1992 | Herwegh et al. | 52/100 |
| 5,678,383 | A * | 10/1997 | Danielewicz | 52/775 |
| 5,695,154 | A * | 12/1997 | Castellucci et al. | 244/130 |
| 6,230,385 | B1 * | 5/2001 | Nelson | 29/450 |
| 6,588,165 | B1 * | 7/2003 | Wright | 52/506.05 |
| 7,478,781 | B2 * | 1/2009 | Granzeier et al. | 244/131 |
| 7,814,638 | B2 * | 10/2010 | Schalla | 29/458 |
| 8,016,152 | B2 * | 9/2011 | Roush et al. | 220/652 |
| 8,028,797 | B2 * | 10/2011 | Douglas | 181/213 |
| 2008/0271402 | A1* | 11/2008 | Gingras | 52/506.02 |
| 2011/0072743 | A1* | 3/2011 | Brescia | 52/173.3 |

\* cited by examiner

STATE OF THE ART

METHOD OF FORMING A PANEL ASSEMBLY OF A VENTRAL FAIRING OF AN AIRCRAFT

CROSS-REFERENCE TO RELATED APPLICATIONS

This application is the National Stage of International Application No. PCT/FR2007/051848, International Filing Date 28 Aug. 2007, which designated the United States of America and which International Application was published under PCT Article 21 (2) as WO Publication No. WO2008/029048 A1 and which claims priority to French Application No. 06 53622, filed 8 Sep. 2006, the disclosures of which are incorporated herein by reference in their entireties.

BACKGROUND

1. Field

The disclosed embodiments relate to a panel assembly, such as panels forming the external skin of a ventral fairing of an aircraft. More specifically, the disclosed embodiments relates to a sealing joint designed to seal the liaison between two adjacent panels of such an assembly.

2. Brief Description of Related Developments

In the aeronautical domain, fitting aircraft with a ventral fairing is known. The ventral fairing, or soft belly, comprises an external panel assembly which forms the external skin of the fairing. The ventral fairing is subjected to numerous thermal and mechanical deformations, both during the assembly of the fairing as well as the successive uses of the corresponding aircraft. In particular, the external skin panels of the ventral fairing have a tendency to become deformed. For example, the distance between two adjacent panels can increase or diminish according to the constraints to which the ventral fairing is subjected.

The use of a sealing joint in the gap existing between two adjacent panels is known in order to seal the joint between the two adjacent panels.

In FIG. 1 of the state of the art, such a sealing joint 1 fills a gap 2 situated between a first 3 and a second 4 external panel of the ventral fairing of an aircraft. The sealing joint 1 comprises a central part 5 which fills the gap 2 and an internal fixing part 6, extending in the same plan and parallel to the central part 5. A thickness of the central part 5 is strictly greater than a thickness of the internal part 6, so that the said parts 5, 6 form two successive plateaus. Thickness is defined as being the dimension extending vertically in relation to the external panels 3, 4.

The panels 3, 4 are fixed to one another via a support part 7. More specifically, the support part 7 is fixed by a first fixing means 8 to the panel 3 and by a second fixing means 9 to the second panel 4. The internal part 6 of the joint 1 is compressed between the support part 7 and the second panel 4 of the fairing. The internal part 6 of the joint 1 being traversed by the fixing means 9, the joint 1 is partially fixed to the panels.

When assembling two panels 3, 4 of the fairing, the central 5 part is cut to the dimensions of the gap 2 obtained in the assembly. The gap 2 dimensions will vary during the assembly of all the fairing panels, and also during the use of the said fairing. When the force of compression brings the panels 3 and 4 closer together, the gap 2 is reduced which can lead to the compression of the central 5 part of the joint 1. Conversely, when the space 2 is increased due to the separation of the panels 3 and 4 of the external skin of the ventral fairing, the central 5 part of the sealing joint makes it no longer possible to completely fill the gap 2. In this case, the presence of a groove between the central 5 part and the leading edge of one of the panels, can cause noise and whistling and create an aerodynamic drag. Furthermore, the airflow on the external skin of the ventral fairing can bring out the central 5 part of the sealing joint 1 from the gap 2 and pull out all or part of the said joint 1.

SUMMARY

In the disclosed embodiments, it is in general sought to supply a panel assembly which is able to tolerate manufacturing dispersions. In the case of a panel assembly designed to form all or part of an aircraft part such as a fairing, it is sought to minimise the impact of movement which can exist between the panels on the aerodynamic drag generated by the aircraft part. It is also sought to improve the aerodynamic profile of an aircraft part. Another aspect of the disclosed embodiments provides a seal for the joint between the two adjacent panels in a panel assembly, whatever the conditions of use of the said assembly, and more specifically whatever the constraints to which the said assembly is subjected.

For this, in the disclosed embodiments, the use of a sealing joint suitable for covering the adjacent edges of the two panels in question is proposed, said adjacent edges being involved in the liaison of the two panels. More specifically, the joint according to the disclosed embodiments fills, at least partially, the space created between the two panels in question, at the same time as covering the external surface of the edge of each of the two panels surrounding the said space. Thus the space created between the two panels is at least partially filled by a central portion of the joint, whereas an upper portion of the joint entirely covers the upper surface of said space, and even above, throughout the said space. Even when the distance between the two panels in question increases, increasing the width of the space between the said panels, the space is still entirely covered by the covering part of the sealing joint. No groove is created into which air could rush. The presence of this covering part of the sealing joint furthermore removes the risk of erosion to the leading edges of the panels. Moreover, because of the aerodynamic profile of this covering part, all risk of aerodynamic drag on the liaison between the two adjacent panels is removed. A solution of this sort also permits the simplification of mounting a panel assembly which is for example intended to form a fairing, since the adjustments and dimensioning between the panels no longer needs to be precisely determined before mounting. Indeed, the presence of the covering part of the sealing joint permits the increase of mounting and dimensioning tolerances. The solution according to the disclosed embodiments can be directly adapted to ventral fairing panels such as currently exist, without any pre-modification to their structure.

The object of the disclosed embodiments is therefore a panel assembly, in which the liaison between two adjacent panels is sealed by a sealing joint, characterised in that the sealing joint comprises a central part, housed in an interstice between the two panels, and an external part, facing the exterior of the assembly, and capable of covering at least partially the external face of the two longitudinal edges of the panels surrounding the interstice.

The exterior of the assembly is defined as being the face designed to be subjected to the constraints and forces of the outside environment. For example, in the case of an assembly forming a ventral fairing for an aircraft, the external face is the face pointing towards the exterior in relation to the internal volume of the fairing and which is subjected to aerodynamic drag.

According to the examples of embodiment of the assembly according to the disclosed embodiments, all or some of the following additional characteristics are possible:

- the sealing joint comprises an internal part, facing the interior of the assembly and capable of covering at least partially the internal face of the two longitudinal edges surrounding the interstice. Thus, the outline of the longitudinal edges is entirely covered by the sealing joint which encloses them. The interior of the assembly is defined as being the opposite of the exterior.
- the internal part of the sealing joint is connected to at least one of the two adjacent panels;
- the internal part of the sealing joint is connected to at least two adjacent panels;
- the adjacent panels are connected to one another via a wale;
- the internal part of the sealing joint is held between the wale and the two adjacent panels.

In one particular aspect of the disclosed embodiments the panel assembly forms the external skin of a ventral fairing of an aircraft.

Another aspect of the disclosed embodiments relates to a method for mounting a panel assembly, in which two adjacent panels are fixed to one another, characterised in that it comprises the following steps:

- measuring a maximum interstice and a minimum interstice between two adjacent panels, capable of being tolerated by the fairing;
- using a sealing joint comprising a central part of which the dimensions are inferior to the dimensions of the minimum interstice, and an external part, designed to be facing the exterior of the assembly, of which the dimensions are strictly greater than the dimensions of the maximum interstice, in order to be able to cover at least partially the longitudinal edges of the panels surrounding the interstice;
- connecting the sealing joint to a first panel, so that the external part of the said joint covers a longitudinal edge of the said panel;
- connecting the second panel to the first panel, by creating an interstice, of within the maximum and minimum interstices, between the two adjacent longitudinal edges of the panels,
- housing the central part of the sealing joint in the interstice,
- cover the longitudinal edge of the second panel bordering the interstice, of the external part of the sealing joint.

According to the examples of implementation of the method according to the disclosed embodiments all or part of the following additional steps are possible:

- connect the first panel and an internal part of the sealing joint to a support part, so that the internal part of the sealing joint is held between the support part and the first panel. The sealing joint is thus held in position in relation to the panels.
- slip the longitudinal edge in question of the second panel between the internal part and the external part of the sealing joint, so that the internal part of the sealing joint is situated between the support part and the said longitudinal edge and connect the second panel to the support part, so that the internal part of the sealing joint is held between the support part and the longitudinal edge of the second panel.

The panels are mounted one after another on the support part. One of the two panels is first positioned in relation to the joint, then the second panel is also positioned in relation to the joint. By positioning the second panel, an interstice of the desired dimensions is created, this also ensures that the longitudinal edges bordering the interstice are properly covered by the joint.

In one particular example of implementation of the method, the internal part of the sealing joint is also connected to the support part.

BRIEF DESCRIPTION OF THE DRAWINGS

The aspects of the disclosed embodiments will be more easily understood when reading the following description and studying the accompanying drawings. These are presented as an indication and are not limitative. The figures represent.

DETAILED DESCRIPTION OF THE DISCLOSED EMBODIMENTS

Figure 4:
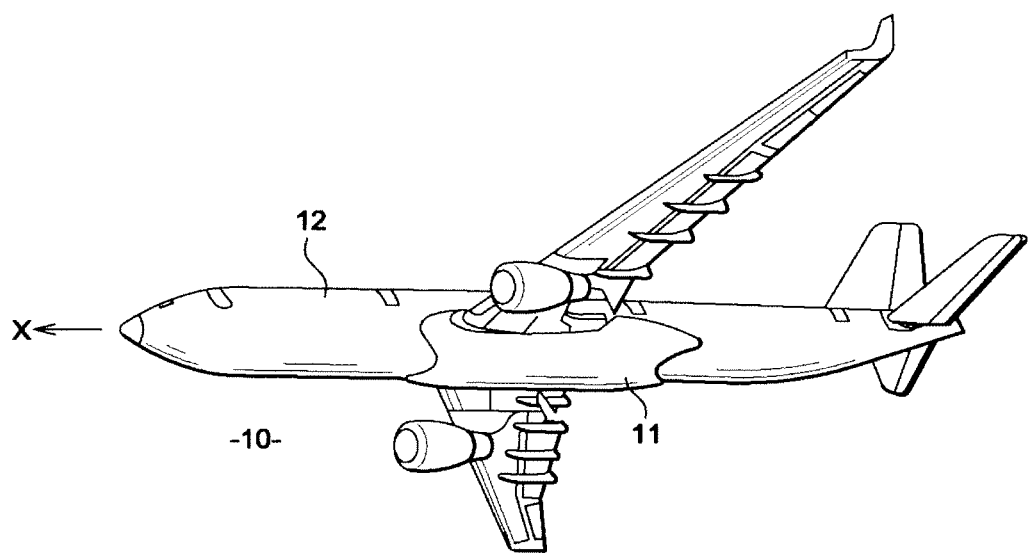
FIG. 4: A representation of an aircraft fitted with a fairing which could be according to the aspects of the disclosed embodiments.

As is shown on FIG. 4, an aircraft 10 is fitted with a ventral fairing 11 situated at a lower part of the fuselage 12. The external skin of the ventral fairing 11 is formed of several panels (not shown on FIG. 4) connected to one another so as to form a supple structure.

Figure 1:
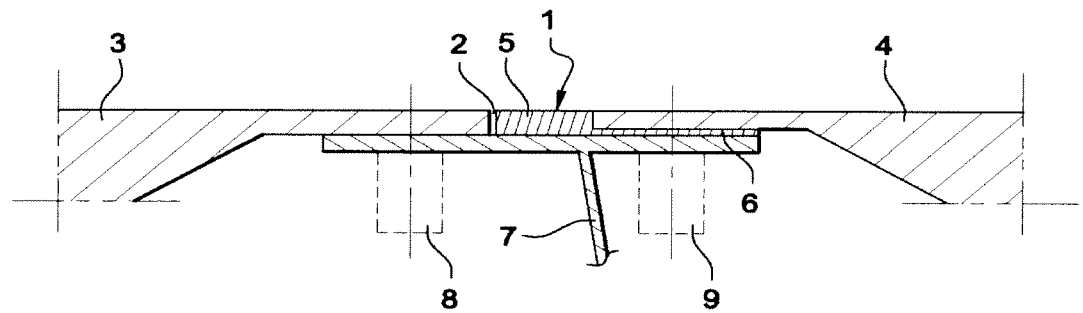
FIG. 1: A schematic representation of a ventral fairing at the level of the joint between two panels of the external skin, fitted with a sealing joint of the previously described state of the art.
Figure 2:
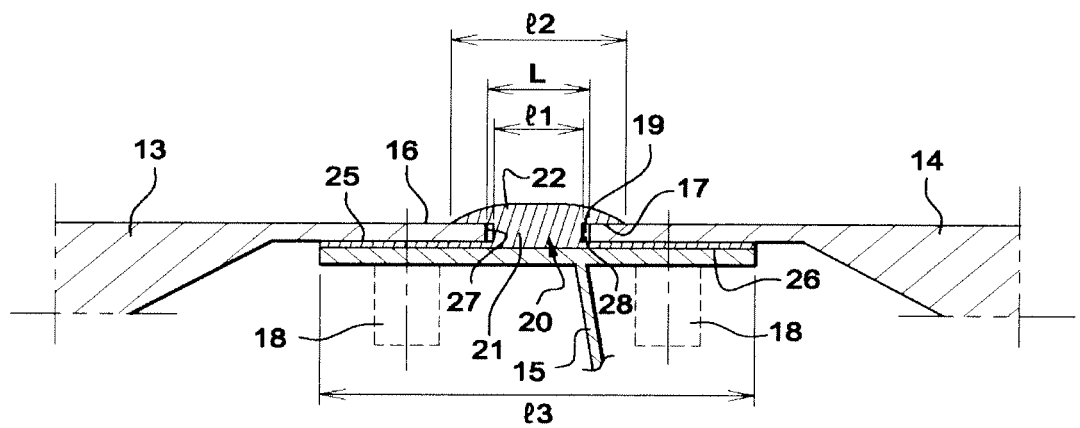
FIG. 2: A schematic representation of a ventral fairing at the level of the joint between two panels of the external skin, fitted with a sealing joint according to the aspects of the disclosed embodiments.

FIG. 2 shows an enlarged view of the ventral fairing 11 at the joint between two adjacent panels 13 and 14 of the external skin of the said fairing 11. It is understood, these panels 13, 14 could belong to any other type of panel assembly.

Panels 13, 14 have, for example, a generally rectangular shape. The adjacent longitudinal edges 16, 17 of each of the panels 13, 14 extend in parallel to each other. The panels 13, 14 are connected to one another via a supporting structure 15 such as a wale. More specifically, the longitudinal 16, 17 edges next to the adjacent panels 13, 14 are fixed to the wale 15 via a fixing device 18, such as a captive nut.

When assembling the panels 13, 14 on the wale 15, an interstice 19 is created between the two adjacent longitudinal 16 and 17 edges so as to obtain the assembly tolerances and permit the deformation of the panels 13, 14 during the use of the ventral fairing. The interstice 19, bordered by the longitudinal 16, 17 edges is designed to have a width L which can be varied according to assembly constraints as well as the comprehension forces or extension forces undergone by the panels 13 and 14. The width is defined as being the dimension of the interstice 19 extending between the two adjacent longitudinal 16, 17 edges.

A sealing joint 20, capable of entirely covering the interstice 19, whatever its width, is used to create the liaison between the panels 13, 14 of the ventral fairing. The sealing joint 20 according to the aspects of the disclosed embodiments has a central 21 part entirely contained in the interstice 19 and an external 22 part, or hat part, facing the exterior of the fairing 11, and able to cover at least the leading edges 27, 28 of the longitudinal 16, 17 edges next to the panels 13, 14. The leading edges are defined as the sides 27, 28 of the longitudinal 16, 17 edges bordering the interstice 19. The external 22 part of the joint 20 is connected to the central 21 part, which it overhangs.

The sealing joint 20 is thus chosen according to the maximum and minimum interstices 19 which can exist between the two adjacent panels 13, 14. Minimum and maximum interstices are defined as being the maximum and minimum dimensions which the interstice 19 can have during the assembly and use of the ventral fairing. More specifically, it is the width L of the interstice 19 which is caused to vary. In order to adapt the width 11 of the central 21 part of the sealing joint, the maximum and minimum widths of the interstice 19 are measured.

For example, the width 11 of the central 21 part of the sealing joint 20 is noticeably equal to the width L of the interstice 19 after assembly of panels 13, 14. Therefore, the width 11 of the central 21 part of the sealing joint 20 is strictly larger than the minimum width L of the interstice, and strictly smaller than the maximum width L of the interstice.

The central part 21 of the joint 20 can be compressed by the longitudinal 16, 17 edges of panels 13, 14 during the shrinking of the interstice 19. Conversely, when the interstice 19 tends to have a width L noticeably equal to the width of the maximum interstice, the central 21 part of the sealing joint 20 tends to recover its initial width 11, which is therefore strictly smaller than the width L of the interstice 19.

However, the whole space of the interstice 19 remains covered by the covering 22 part of the sealing joint 20. Indeed, the dimensions of the covering 22 part of the sealing joint 20 are designed to be able to completely cover the interstice 19, from the minimum interstice to the maximum interstice. To do this, the width 12 of the covering part 22 of the sealing joint 20 is strictly greater than the width of the maximum interstice.

Figure 3:
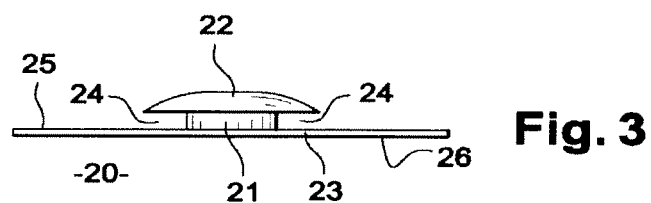
FIG. 3: A schematic representation of a cross section of a sealing joint according to the aspects of the disclosed embodiments.

The covering 22 part of the sealing joint 20 presents an aerodynamic profile in order to minimise the drag on the joint between the panels 13 and 14 of the ventral fairing. In the example in FIGS. 2 and 3, the covering 22 part has a slightly bulging shape.

The sealing joint 20 can also comprise an internal 23 part, facing the interior of the fairing and connected to the central 21 part. The internal 23 part is diametrically opposed to the external 22 part.

The width 13 of the internal 23 part of the sealing joint 20 is for example strictly larger than the width 11 of the external 22 part, which is itself strictly greater than the width 12 of the central 21 part. The sealing joint 20 is therefore made up of three successive layers, one internal layer formed by the internal 23 part, one intermediary layer formed by the central 21 part and one external layer formed by the external 22 part, with different widths. Thus a groove 24 is created on the right and left of the central 21 part. The grooves 24 are respectively bordered by the external 22 part and the internal 23 part of the sealing joint 20.

The leading edge 27, 28 of one of the longitudinal 16, 17 edges which border the interstice 19 is housed in each of these grooves 24. The leading edges 27, 28 are thus enclosed in the sealing joint 20 and therefore completely protected from the risk of corrosion.

The risk of the sealing joint 20 being pulled out can be avoided by fixing the sealing joint 20 to at least one of the panels 13, 14. The aerodynamic form of the covering 22 part of the joint 20 allows air to flow over the said joint without pulling it out.

In the example shown in FIG. 2, the sealing joint 20 is fixed to both the panels 13, 14. To do this a left flank 25 and a right flank 26 of the internal 23 part of the sealing joint 20 are respectively connected to the first and second panels 13, 14.

The left and right flanks are defined as being the sections of the internal 23 part of the sealing joint 20 sited respectively on the right and left of the central 21 part of the sealing joint 20. The left 25 and right 26 flanks of the internal 23 part are each compressed between the wale 15 and the corresponding longitudinal 16, 17 edges of panels 13, 14.

It is also possible to connect only one of the two flanks 25, 26 of the corresponding panel 13, 14, the second flank 25, 26 being able therefore to be held compressed between the wale 15 and the panel 13, 14 or even not exist.

In the case where the sealing joint 20 does not have an internal 23 part, it is possible to connect the external 22 part and/or the central 21 part of panels 13, 14.

The sealing joint can for example be manufactured using moulding.

What is claimed is:

1. A method of forming a panel assembly of a ventral fairing of an aircraft, comprising:
    mounting first and second panels on a support structure to form at least a portion of the panel assembly of the ventral fairing the aircraft, with a variable width interstice being provided between adjacent longitudinal edges of the mounted first and second panels, wherein the width of the variable width interstice varies as a maximum and a minimum dimension between the adjacent edges of the first and second panels according to mounting constraints of the first and second panels on the support structure and compression and expansion forces encountered during use of the aircraft; and
    sealing adjacent edges of the first and second panels with a sealing joint configured to minimize aerodynamic drag on the aircraft generated by movement of the first and second panels, wherein the sealing joint comprises:
        a central part housed in the variable width interstice,
        an external part facing an exterior of the panel assembly and configured to cover an external face of the longitudinal edges of the mounted first and second panels, with the external part being provided with an aerodynamic profile to minimize the aerodynamic drag at a location between the first and second panels, and
        an internal part facing an interior of the assembly and configured to cover an internal face of the longitudinal edges of the mounted first and second panels.

2. The method of claim 1, wherein the central part of the sealing joint has a width larger than the minimum dimension of the variable width of the interstice and smaller than the maximum dimension of the variable width of the interstice.

3. The method of claim 1, wherein the central part of the sealing joint has an initial width, and is configured to be compressed during shrinkage of the width of the interstice to its minimum distance.

4. The method of claim 3, wherein the central part of the sealing joint is configured to recover from compression to its initial width, in which the initial width is smaller than the width of the interstice at its maximum variable distance.

5. The method of claim 1, wherein the internal part of the sealing join has a width greater than that of the external part.

6. The method of claim 1, wherein the central part, the external part and the internal part of the sealing joint have different widths.

7. The method of claim 1, wherein at least one of the longitudinal edges of the first and second panels is fixed to the support structure by a fixing device.

8. The method of claim 7, wherein the fixing device is a captive nut.

9. The method of claim 1, wherein the support structure is a wale.

* * * * *